(No Model.)

J. HONECKER.
FRUIT GATHERER.

No. 359,211. Patented Mar. 8, 1887.

WITNESSES
Phil C. Dieterich.
A. E. Towell.

INVENTOR
John Honecker
by: T. H. Alexander
Attorney

UNITED STATES PATENT OFFICE.

JOHN HONECKER, OF CLEVELAND, OHIO.

FRUIT-GATHERER.

SPECIFICATION forming part of Letters Patent No. 359,211, dated March 8, 1887.

Application filed December 18, 1886. Serial No. 221,981. (No model.)

*To all whom it may concern:*

Be it known that I, JOHN HONECKER, of Cleveland, in the county of Cuyahoga and State of Ohio, have invented certain new and useful Improvements in Fruit-Gatherers; and I do hereby declare that the following is a full, clear, and exact description thereof, reference being had to the accompanying drawings, and to the letters of reference marked thereon, which form part of this specification, in which—

Figure 1:
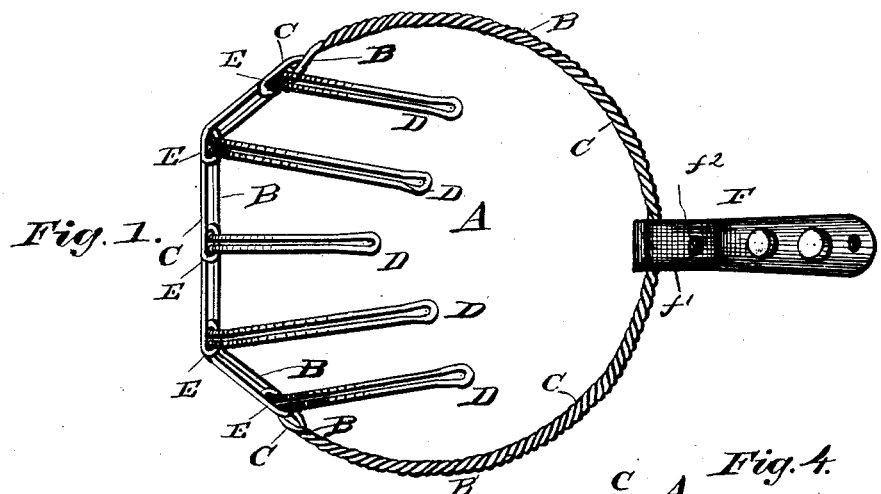
Figure 4:
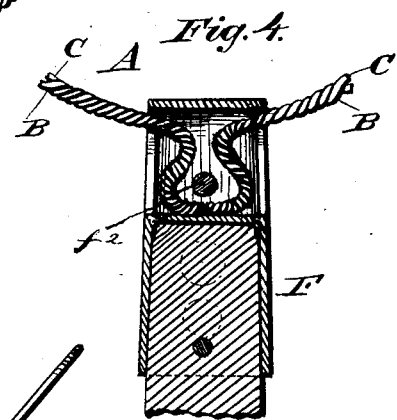
Figure 2:
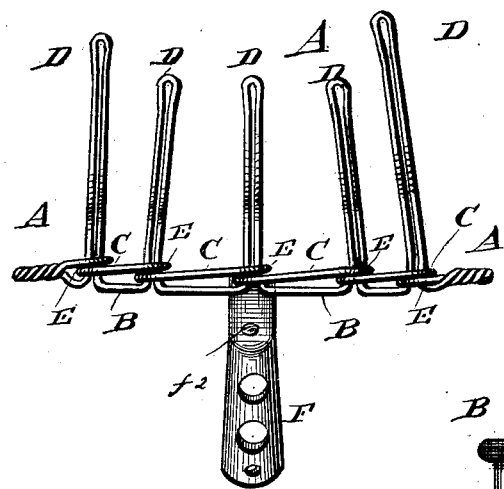
Figure 3:
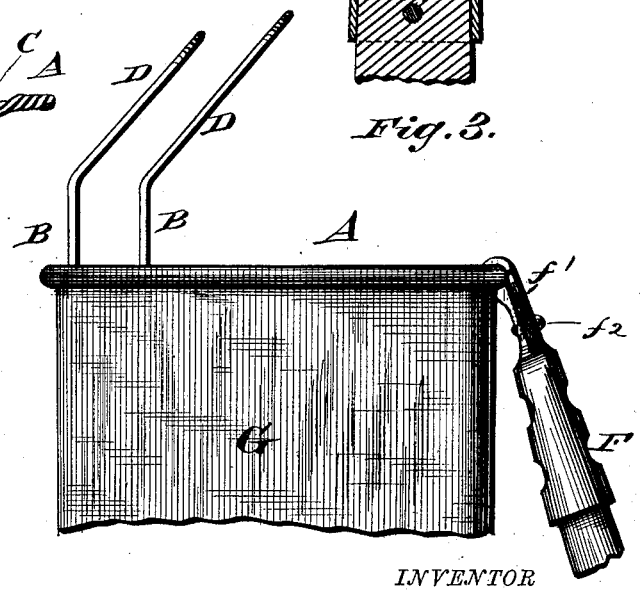

Figure 1 is a top plan view of my improved fruit-gatherer. Fig. 2 is a front elevation of the same. Fig. 3 is a side view with the bag attached. Fig. 4 is a detail enlarged view showing the manner of attachment of the picker-frame to a handle-socket.

This invention relates to improvements in fruit-gatherers, and has for its objects to provide a device that will be both light and durable, which will not bruise the fruit, and which by the peculiar form of its prongs or arms will insure the fruit falling into the bag or receptacle attached thereto by causing the fruit to take such a position within its mouth or ring before it is detached that it cannot escape therefrom, obviating the necessity of the operator having any previous knowledge or experience in picking fruit with such devices.

The invention consists, essentially, in the peculiar and novel manner of making the picker-head, which is formed of wire, and in certain other details of construction hereinafter described, and clearly set forth in the accompanying claims.

Referring to the accompanying drawings by letters, A designates the picker-head, composed of two wires, B C, which are twisted, as shown, and bent into a circle, which may be of any desired diameter, but which is preferably large enough to permit the gathering of two or more apples or other fruits simultaneously, where the fruit happens to grow in clusters or bunches.

The wire B is the principal one of the pair, and is entwisted alternately with wire C for about one-third of the circumference of the head A, starting from one of the adjoining ends of the pair. The wire B is then formed with a series of vertical return-bends, D, forming the picking-fingers, each of which is about six inches in length, and are all equidistant from each other, as shown, the distance being about three-quarters of an inch between each and the wire B running straight and at right angles from one bend D to the next, as shown. These bends D occupy about a second third of the circumference of head A, and at their end wire B is again entwisted with wire C for the remainder of its length. At the first bend D in wire B, starting as described, wire C, being no longer twisted, is made to serve a very valuable purpose in strengthening the bends or fingers D, as follows: At the first bend D, wire C rises above wire B and above the base of the bend, and is then taken one turn around the bend, near its base, and beneath itself, as shown, forming a kind of running knot or loop, E, which serves to keep the lower portions of the wire in the bend in proper close relation to each other and hold these bends in a vertical position with regard to body A when the latter is horizontal, as shown. From the first bend or finger D, wire C, after its loop E has been formed, as described, passes straight to the next bend, above wire B, turns around the same and beneath itself, as described, and so on to the end of the bends, as shown, where it is retwisted with wire B to its end, or for a distance corresponding in length to that of the first twisted portion of the wires, thus forming the third portion of the circumference of part A.

It is obvious that wire B is much longer than wire C, the difference in length being regulated by the number of bends D in wire B.

The wires B C may be united, as described, before they are bent into circular form to give the desired contour to head A, and after being so bent the adjoining ends of the pair of wires are bent downward at right angles to body A, but on the opposite side thereof to bends D, for securing the body A to a suitable handle-socket. This may be done in various ways; but I prefer using the means illustrated in Fig. 4, in which the ends of the wires of body A are bent into an S form, and may be placed in correspondingly-shaped grooves formed in the head of socket F, and after being so placed they are held securely by the piece $f'$, which is placed over the wires and riveted in place by a suitable rivet, $f^2$. This socket F is preferably perforated, as shown, so as to render it as light as is consistent with strength. By means of socket F body A is secured to a proper handle.

After head A is formed, as described, the bends D will stand in the arc of a circle coinciding with the circumference of the head and form the picking-fingers thereof, and I then proceed to give these fingers the necessary crook or bend to cause them to direct the fruit into the mouth of the head, as described. Each bend or finger D rises vertically from body A for about one inch. They are then bent inward at an angle of about forty-five degrees with respect to the plane surface of head A, and, owing to their being set on an arc, their upper ends will converge toward the center of the mouth of head A, as shown. It is obvious that when the gatherer is in use the fingers D, owing to their peculiar shape, will direct the fruit downward until it lies partially within the mouth of head A before they will sever the fruit from its stem; also, that these fingers can be inserted between the branches or prongs of a tree and pick any fruit growing therein, and which is inaccessible to ordinary gatherers, and which, if it could be reached by them, would be so bruised, owing to the roughness and non-adaptability of the gatherers to pick in such places, that they would be unfit for keeping. To catch the fruit when picked, I attach to body A a bag, G, of suitable material, in such manner, preferably, as to entirely cover wire C, and also all of wire B except the bends or fingers D, as shown in Fig. 3. By thus attaching bag G, I avoid any possibility of the fruit being bruised against the wires when falling into the bag, although my picker presents no angular edges to abrade the fruit even when the wires are not covered, and which is a valuable feature.

I am aware that fruit-gatherers have been made having fingers rising from the upper edge of the metallic band or ring forming their head, and such I do not claim, broadly.

Having described my invention, what I claim as new is—

1. A fruit-gatherer frame composed of two wires entwisted to form the ring or head, one of said wires being formed with a series of bends forming the picking-fingers, while the other is continuously looped around each of said fingers, thus forming a brace and tie for each, all substantially as set forth.

2. A fruit-gatherer composed of two wires, one having the series of vertical bends or fingers D, bent as described, and the other entwisted therewith and securing the lower portion of bends D together, substantially in the manner and for the purpose specified.

3. In a fruit-gatherer, the head A, composed of the wires B C, wire B having a series of vertical bends or fingers, D, bent inward and converging, as described, and wire C entwisted with wire B and looped around the lower portions of fingers D, substantially in the manner and for the purpose described.

4. As an improved article of manufacture, a fruit-gatherer composed of the two wires B C, entwined to form the rim, the wire B bent to form the fingers D, and the wire C bent continuously around the series of fingers thus formed, and the receiving-bag G, properly secured to the rim, all substantially as shown and described.

In testimony that I claim the foregoing as my own I affix my signature in presence of two witnesses.

JOHN HONECKER.

Witnesses:
R. MOTT,
C. A. THOMAS.